Figure 1:
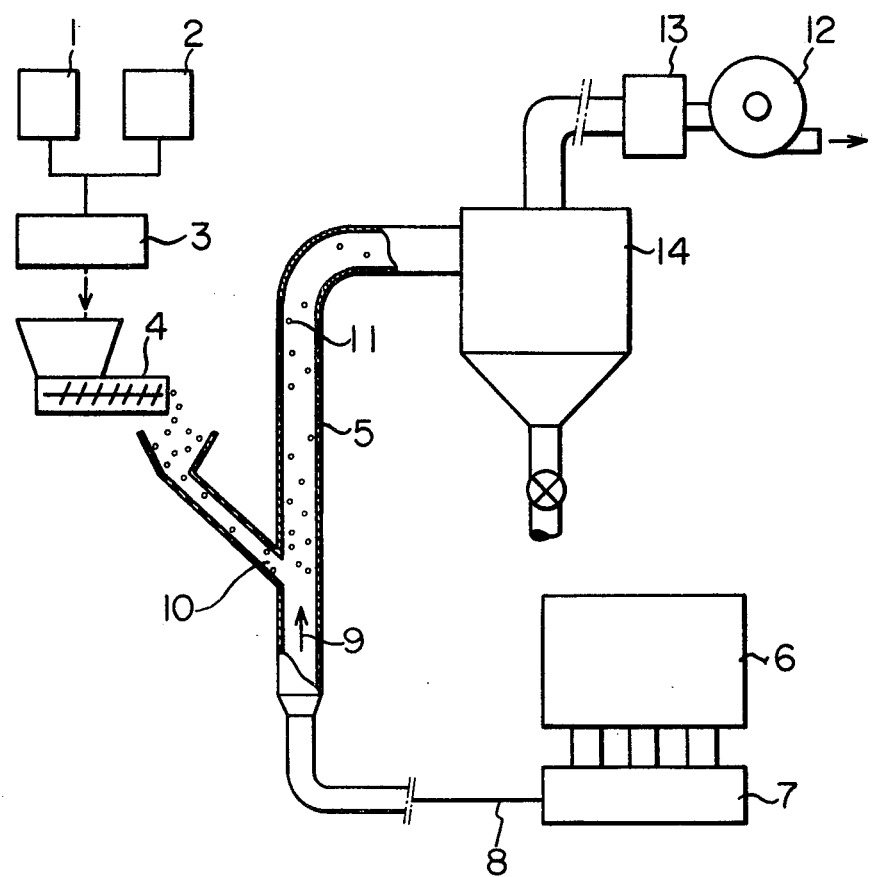

United States Patent [19]

Nakaguchi et al.

[11] 4,252,754
[45] Feb. 24, 1981

[54] PROCESS FOR MANUFACTURING GLASS RAW MATERIAL GRANULAR PELLETS

[75] Inventors: Kunio Nakaguchi; Seiichiro Manabe, both of Itami, Japan

[73] Assignee: Nippon Sheet Glass Co., Ltd., Japan

[21] Appl. No.: 19,896

[22] Filed: Mar. 12, 1979

[30] Foreign Application Priority Data

Mar. 16, 1978 [JP] Japan .................. 53/3085578

[51] Int. Cl.³ .................................. B01J 2/04
[52] U.S. Cl. ............................. 264/12; 264/117; 264/DIG. 51
[58] Field of Search ............ 264/117, DIG. 51, 6, 264/12

[56] References Cited

U.S. PATENT DOCUMENTS

| | | | |
|---|---|---|---|
| 3,043,652 | 7/1962 | Schytil | 264/117 |
| 3,956,446 | 5/1976 | Eirich et al. | 264/117 |

Primary Examiner—Donald E. Czaja
Assistant Examiner—James R. Hall
Attorney, Agent, or Firm—Wenderoth, Lind & Ponack

[57] ABSTRACT

A process for the manufacture of glass raw material granular pellets is provided.

The process comprises:

(a) forming a mixture of powdered raw glass material with an aqueous solution of a binder, which can be converted into a solid upon exposure to an elevated temperature gas stream, said binder not adversely affecting the glass subsequently formed of said material, (b) directing a stream of gas at an elevated temperature upwardly through a substantially erect straight pipe having the upper end thereof connected to a solid-gas separator;

(c) feeding said mixture into an opening in said pipe and into said upwardly flowing heated gas stream to disperse said mixture, (d) drying said dispersed mixture in said gas stream and bonding the particles in said dispersed mixture with said binder to form granular pellets thereof, and (e) separating said formed granular pellets from said gas stream in said separator.

5 Claims, 4 Drawing Figures

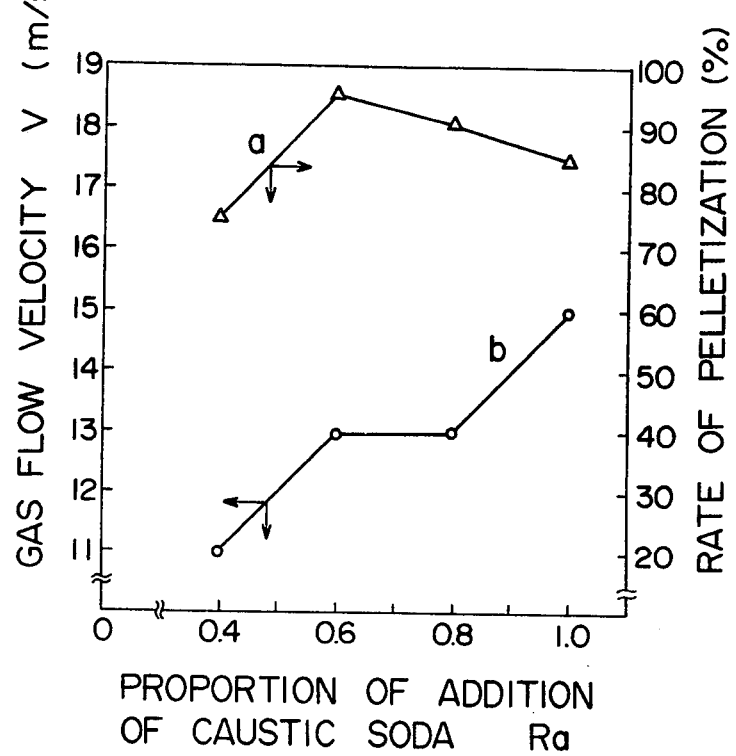

PROCESS FOR MANUFACTURING GLASS RAW MATERIAL GRANULAR PELLETS

The present invention relates to a process for manufacturing granular pellets by pelletizing a powdered glass raw material with an added liquid binder.

To conserve energy, prior art processes have used exhaust waste gas from a glass melting furance to preheat the raw glass material prior to entering the glass melting furnace. Also known for improving the melted property of the material before entering the furnace, is the step of sintering the material to conduct a vitrification reaction, and to convert part of the silica sand into silicate.

In the above known processes, common powdered glass raw material is molded into pellets at normal temperature, then dried, preheated and sintered. In general powdered raw glass material and a binder of aqueous caustic soda and water glass are fed to either a rotating drum, an inclined pan or an extrusion pelletizer to produce the pellets. Drying is carried out by passing the pellets through either a rotating drum, a moving bed dryer or a porous band dryer. See U.S. Pat. Nos. 3,969,100 and 4,031,175 and Japanese Patent Publication No. 43,395/71.

Because of the tacky nature of such binders as caustic soda and water glass, the raw glass material mixture adheres to the pelletizer as well as the dryer, the conveyor and walls of storage hoppers, thus creating maintenance and operational problems. The strength of the product of such processes is also comparatively low, resulting in adverse breakage during storage or transporting to and and in the dryer. Further disadvantages in the prior art processes lie in separately carrying out the pelletizing operation and the drying operation in distinct and independent processing equipment. Because such arrangements require a greater number of steps, and since in general, pelletization speed is fairly slow, large equipment is appropriate.

One object of the present invention is to provide a process for making granular pellets from raw glass material powder, wherein the pellets are suitable for feeding to a glass melting furnace, and the particles within the pellets are strongly bonded by means of a binder.

Another object is to provide a process for making granular pellets from powdered glass raw material in a simple, yet small apparatus without the treated material adhering to the interior wall thereof.

The inventors have discovered a process for achieving the above objects by mixing powdered glass raw material with a suitable liquid binder and feeding the mixture into a substantially erect straight pipe in which a heated gas stream is upwardly flowing. The gas stream disperses and agitates the mixture, which upon drying in the heated gas stream, bonds the powder particles and forms the granular pellets thereof. From the erect pipe, the bonded granular pellets are conveyed by the gas stream to a solid-gas cyclone separator, where the pellets are recovered from the gas stream. The use of a straight pipe for forming the pellets prevents the powder/binder mixture therein from sticking to the interior of the pipe wall. The use of a simple straight pipe having no baffle plate or other protuberances therein is preferred.

The glass raw material composition used in the present invention is that commonly known, containing silica sand, limestone, quicklime, feldspar and soda ash etc. for producing $K_2O$, $MgO$, $ZnO$ and $BaO$ etc., ingredients used to attain clarifying, coloring or oxidizing conditions. The average diameter of the particles in the glass raw material is not particularly limited, but 50–300 micron sizes are preferred.

The liquid binder is an aqueous solution of a substance which is converted into a solid upon exposure to a heated gas stream, and which does not adversely affect the glass composition even when contained as a component therein. Preferably the binder is an aqueous solution of a substance which has the property to render the glass raw material particles tacky to bond the particles as well as to become an added component of the final glass composition. Examples of the binder include an aqueous solution of caustic soda, water glass, potassium carbonate and milk of lime. To limit the heat absorbed by the latent heat of water to the least extent, the highest concentration of binder in the aqueous solution is preferred, but limited to the extent that the operation is not hindered thereby. For example, an aqueous solution having a caustic soda content of 48–73% can be used. While such high concentration solution may generally solidify, it can be liquified by heating.

For the heated gas stream in the pipe, air is preferable. However, at least part of the exhaust waste gas from a glass melting furnace is preferable as an energy saving step.

The temperature of the heated gas stream depends upon the proportion of binder in the mixture, the size of the pellets being formed, and the length of the straight pipe constituting the pelletizer. The lower temperature limit at which the pellets can be formed, and are nearly dried, is determined on the basis that the pellets, upon impinging against the interior wall of the pipe, do not adhere thereto. The upper temperature limit of the gas stream is that which will not melt the pellets, this being 720° C. Appropriate values of the gas stream temperature and gas stream velocity in the pipe may be determined experimentally, using apparatus amenable to the above conditions.

When the powdered glass raw material/binder mixture is introduced into the heated gas stream, it is dispersed and agitated by the gas stream and is gradually conveyed upwardly in the straight pipe pelletizer. Upon being dispersed into appropriate sizes, the dispersed mixture is dried by the heated gas stream and is converted into strong granular pellets by the bonding action of the binder. If upon introducing the glass raw material/binder mixture into the gas stream, the mixture is not adequately dispersed (as is likely with a mixture of high binder concentration), a cage mill may be used at the pipe opening for the mixture to aid the dispersion into the gas stream. From the straight pipe pelletizer, the granular pellets and gas stream pass to a solid-gas cyclone separator where the pellets are recovered.

The size of the formed pellets is determined mainly by the proportion of liquid binder in the mixture and the velocity of the heated gas stream in the pipe pelletizer. In general, as the liquid binder content is increased, while the gas stream velocity is low, the diameter of the formed pellets increases. The process generally produces pellets having an average diameter of about 0.3–3.0 mm, more particularly about 0.5–1.0 mm. Since pelletization and drying occur in the pipe quickly, the period of time the dispersed mixture remains tacky is quite short, thereby reducing the possibility of the dispersed material adhering to the interior wall of the pipe. Since pelletizing, drying and heating the pellets is carried out in a simple, single device, the number of separate and distinct steps are reduced, resulting in relatively small, compact equipment occupying little floor space. Further, the invention produces a high yield of bonded particles formed into granular pellets having a comparatively uniform diameter.

FIG. 1 is a schematic diagram illustrating the means to carry out the invention process. A powdered glass raw material in container 1 and a binder of an aqueous solution of caustic soda in container 2 are fed to fret mill or pug mill mixer 3 and blended in an appropriate proportion. From mixer 3 the mixture flows to screw feeder 4 and then through a conduit connected to a side opening of airborne pelletizer 5. As a straight, substantially erect pipe, pelletizer 5 receives the mixture 10 which is impinged upon, dispersed and agitated by the heated waste gas stream 9 flowing upwardly therein. Waste gas 9 is exhausted from melting furnace 6 and passes through a heat regenerating brick chamber 7. From chamber 7 the exhaust gas flows through conduit 8, and enters the lower end of straight pipe pelletizer 5. When material 10 is dispersed by gas stream 9 and dried, granular pellets are formed usually within several seconds, and having an average particle diameter of 0.3–3.0 mm.

In its simplest form, airborne pelletizers comprise a simple straight pipe as part of waste gas conduit 8. The heated gas stream 9 and entrained granular pellets, leaving the upper end of pelletizer 5, are pulled by exhaust blower 12 into cyclone separator 14. The product pellets descend into a discharge exit of separator 14, while the gas stream and entrained fines pass upwardly into dust collector 13, with the gas being exhausted through blower 12. The granular pellets leaving the exist of cyclone separator 14 pass to glass melting furance 6. The size of the formed pellets depends upon the liquid binder content in the mixture and the pelletizer gas stream velocity. As the liquid binder content in the mixture is increased, and the gas stream velocity maintained low, the diameter of the formed pellets increases. For example, with a 48% aqueous solution of caustic soda as 5–30% (preferably 10–24%) by weight in the mixture, and a gas stream velocity of 5–30 m/sec (preferably 8–17 m/sec), pellets having a diameter of 0.5–4.0 mm are produced.

Granular pellets withdrawn from cyclone separator 14 can be recycled, wherein they are added to mixture 10 and fed back to pelletizer 5. By so doing, granular pellets having a more uniform particle size distribution are produced.

The examples describe the preferred ebodiments of the invention process. In the examples, reference to "the necessary soda content" means the amount of $Na_2O$ required in a given glass composition.

EXAMPLE 1

A slurry was formed of the following components:
127 Kg silica sand, average particle diameter 30–300 microns
40 Kg dolomite, particle diameter 50–500 microns
8 Kg limestone, particle diameter 10–300 microns
20 Kg feldspar, particle diameter 10–500 microns
8 Kg soda ash, particle diameter 150–500 microns
5 Kg salt cake, particle diameter 150–500 microns
51 1 Kg 48% aqueous solution of caustic soda
resulting in a caustic soda aqueous solution content of 19.5%, and a moisture content of 10.1%.

The caustic soda provided 80% of the necessary soda content, while the soda ash provided the remaining 20%.

The slurry mixture was fed to pelletizer 5 at a rate of 20 Kg/hour. Pelletizer 5 comprised an erect straight steel pipe having a diameter of 63.5 mm and a straight length portion from the slurry mixture feed opening to an upper curve of the pipe of 4 meters.

Waste gas 9, generated in glass melting furnace 6, was passed through heat regenerating chamber 7, then reheated with a burner (not shown) and flowed into the lower end of pelletizer 5 at a temperature of 650° C. and a velocity of 13 m/sec. The granular pellets leaving cyclone separator 14 had a temperature of 350° C. and a diameter of 3 mm maximum and 0.8 mm average. The particles making up the pellets were strongly bonded with sodium carbonate formed by a reaction of the caustic soda and carbon dioxide in the heated exhaust gas stream 9.

EXAMPLE 2

Figure 2:
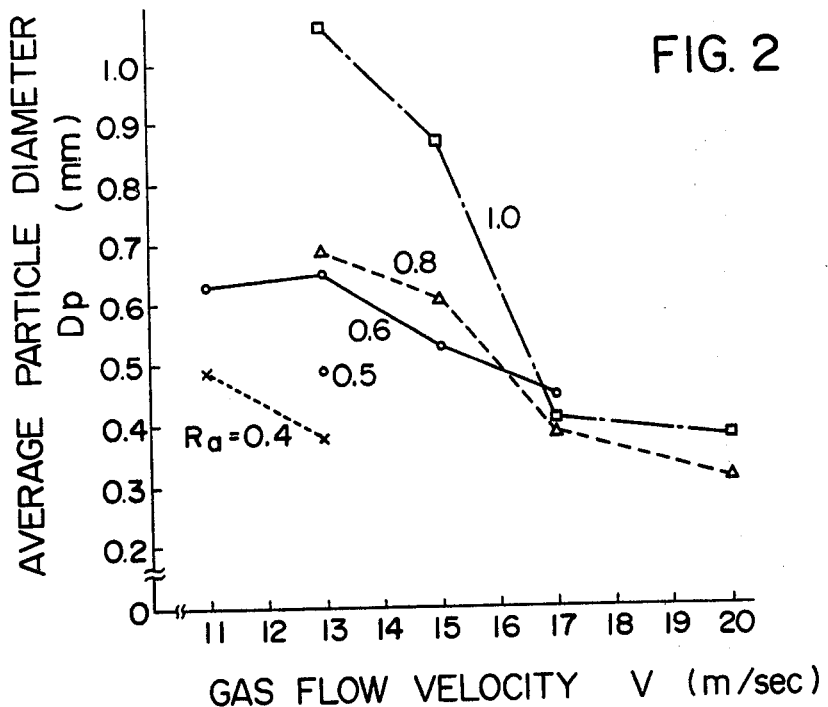
Figure 3:
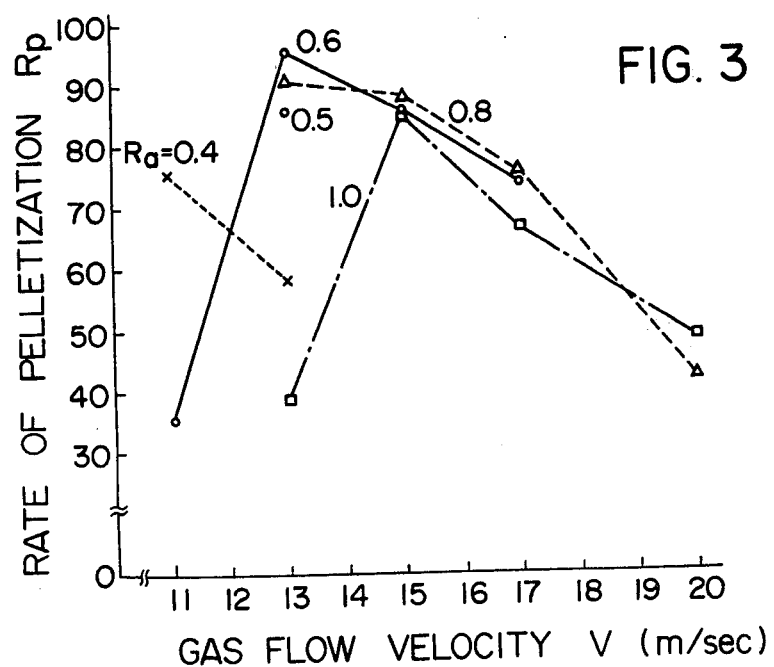

Using the apparatus of Example 1, the process was conducted to determine the effect of varying the caustic soda solution content and the pelletizer gas stream velocity. The relationship between the above factors on the average diameter of the formed pellets and on the rate of pelletization are shown in FIGS. 2-4. The parameter Ra is the ratio of $Na_2O$ in the caustic soda to the $Na_2O$ required in the given glass composition. For example, Ra=0.4 indicates that 40% of the $Na_2O$ required in the given glass composition is provided in the caustic soda, while 60% of the $Na_2O$ required is provided in the soda ash component.

FIG. 2 plots flow velocity of gas V (m/sec) as the abcissa vs. particle diameter Dp(mm) of the formed pellets, as the ordinate. This plot shows that irrespective of the values of Ra, the average diameter of the formed pellets decreases when there is an increase in the gas stream velocity. Also shown is that as the proportion of caustic soda in the mixture is increased, i.e. Ra is increased, the average diameter of the formed pellets increases.

FIG. 3 shows the relationship of the rate of pelletization $R_P$ (as ordinate) to the gas stream velocity V (m/sec as abcissa) for select values of Ra. FIG. 3 also indicates that for every value of Ra, there is a value of gas stream velocity which establishes a maximum rate of pelletization. The rate of pelletization is defined as the ratio of granular pellets of 0.3 mm or greater diameter to the total amount of granular pellets formed.

In FIG. 4, line a shows the relationship between Ra and the rate of pelletization. Line b in the figure shows the relationship between Ra and the gas stream velocity. FIG. 4 also shows that as the caustic soda content is increased, i.e. Ra is increased, the gas stream velocity increases. Further indicated in the figure is that a rate of pelletization above 85% may be achieved for values of Ra between about 0.5 and 0.1.

What is claimed is:
1. A process for manufacturing glass raw material granular pellets, comprising:
(a) forming a mixture of powdered raw glass material with an aqueous solution of a binder, which can be converted into a solid upon exposure to an elevated temperature gas stream, said binder not adversely affecting the glass subsequently formed of said material,

(b) directing a stream of gas at an elevated temperature upwardly through a substantially erect straight pipe having the upper end thereof connected to a solid-gas separator, (c) feeding said mixture into an opening in said pipe and into said upwardly flowing heated gas stream to disperse and to agitate said mixture, (d) drying said dispersed mixture in said gas stream and bonding the particles in said dispersed mixture with said binder to form granular pellets thereof, and (e) separating said formed granular pellets from said gas stream in said separator.

2. The process of claim 1 wherein said elevated temperature gas stream is exhaust waste gas from a glass melting furnace.

3. The process of claim 1 or 2 wherein said binder is caustic soda and wherein the ratio of $Na_2O$ in said binder to the amount of $Na_2O$ required in the glass composition to be made from said material is 0.4 to 1.0.

4. The process of claim 3 where said caustic soda solution concentration is 48%; said solution content is 5-30% by weight of said mixture; said gas stream velocity in said pipe is 5-30 m/sec; and the diameter of said formed granular pellets is 0.5-4.0 mm.

5. The process of claim 4 wherein said solution content is 10-24% by weight of said mixture, and said heated gas velocity in said pipe is 8-17 m/sec.

* * * * *

UNITED STATES PATENT AND TRADEMARK OFFICE
CERTIFICATE OF CORRECTION

PATENT NO. : 4,252,754
DATED : February 24, 1981
INVENTOR(S) : KUNIO NAKAGUCHI and SEIICHIRO MANABE It is certified that error appears in the above-identified patent and that said Letters Patent are hereby corrected as shown below:

Please correct item [30] foreign application priority data as follows:

Change "53/3085578" to -- 53/30855 --;

Column 3, line 66, change "511 Kg" to -- 51 Kg --.

Signed and Sealed this

Twenty-ninth Day of September 1981

[SEAL]

Attest:

GERALD J. MOSSINGHOFF

Attesting Officer

Commissioner of Patents and Trademarks